United States Patent [19]

Etzbach

[11] Patent Number: 4,952,678

[45] Date of Patent: * Aug. 28, 1990

[54] TRISAZO DYES

[75] Inventor: Karl-Heinz Etzbach, Frankenthal, Fed. Rep. of Germany

[73] Assignee: BASF Aktiengesellschaft, Ludwigshafen, Fed. Rep. of Germany

[*] Notice: The portion of the term of this patent subsequent to Jan. 26, 2005 has been disclaimed.

[21] Appl. No.: 113,910

[22] Filed: Oct. 29, 1987

[30] Foreign Application Priority Data

Nov. 15, 1986 [DE] Fed. Rep. of Germany ....... 3639156

[51] Int. Cl.$^5$ ................. C07C 107/04; C07C 107/00; C09B 31/16; C09K 19/24
[52] U.S. Cl. .............................. 534/577; 252/299.68; 534/582; 534/596; 534/601; 534/754; 534/809; 534/831; 534/832; 534/807
[58] Field of Search ...................... 534/577, 809, 754; 252/299.68

[56] References Cited

U.S. PATENT DOCUMENTS

| | | | |
|---|---|---|---|
| 3,941,560 | 3/1976 | Renfrew et al. | 534/809 X |
| 4,299,720 | 11/1981 | Osman et al. | 252/299.1 |
| 4,350,603 | 9/1982 | Aftergut et al. | 534/577 X |
| 4,359,398 | 11/1982 | Cole et al. | 534/577 X |
| 4,376,715 | 3/1983 | Cognard et al. | 252/299.1 X |
| 4,395,350 | 7/1983 | Boller et al. | 252/299.1 |
| 4,395,390 | 7/1983 | Boller et al. | 534/577 X |
| 4,426,312 | 1/1984 | Claussen | 252/299.1 |
| 4,466,899 | 8/1984 | Ditter et al. | 252/299.1 |
| 4,493,532 | 1/1985 | Kaneko et al. | 534/577 X |
| 4,585,574 | 4/1986 | Blunck et al. | 252/299.1 |
| 4,600,527 | 7/1986 | Imazeki et al. | 534/577 X |
| 4,676,923 | 6/1987 | Yasui et al. | 534/577 X |
| 4,721,779 | 1/1988 | Etzbach | 534/577 |

FOREIGN PATENT DOCUMENTS

| | | | |
|---|---|---|---|
| 43904 | 1/1982 | European Pat. Off. | 534/577 |
| 91225 | 10/1983 | European Pat. Off. | 252/299.1 |
| 54217 | 6/1984 | European Pat. Off. | 252/299.1 |
| 55838 | 7/1984 | European Pat. Off. | 252/299.1 |
| 65689 | 7/1984 | European Pat. Off. | 252/299.1 |
| 56492 | 12/1984 | European Pat. Off. | 252/299.1 |
| 2627215 | 1/1977 | Fed. Rep. of Germany | 534/577 |
| 2902177 | 7/1980 | Fed. Rep. of Germany | 252/299.1 |
| 3028593 | 2/1981 | Fed. Rep. of Germany | 252/299.1 |
| 3342040 | 5/1985 | Fed. Rep. of Germany | 252/299.1 |
| 59-74162 | 4/1984 | Japan | 534/577 |
| 60-36569 | 2/1985 | Japan | 534/577 |
| 62-555 | 1/1987 | Japan | 534/577 |

OTHER PUBLICATIONS

Handbook of Liquid Crystals, pp. 611 et seq. (1980) Kelker et al.
Mol. Cryst. Liq. Cryst., vol. 55, pp. 51 et seq. (1979) Cox.
Elektronik 14, pp. 66 et seq. Pauls et al., (982).
J. Phys. D: Appl. Phys., vol. 11, pp. 479 et seq. (1978) Constant et al.
Mol. Cryst. Liq. Cryst., 1980 vol. 60, pp.99–110 Jones et al.
Chimia 34, pp. 47 et seq. (1980) Gray I.
Chimia 34, p. 53 (1980) Gray, II.
Journal of the Society of Dyers and Colourists, 1979, vol. 95, Simborowski, p. 356.

Primary Examiner—Floyd D. Higel
Attorney, Agent, or Firm—Oblon, Spivak, McClelland, Maier & Neustadt

[57] ABSTRACT

Trisazo dyes of the formula

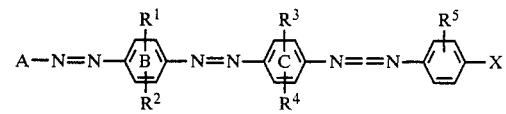

where $R^1$, $R^2$, $R^3$ and $R^4$ are identical or different and each, independently of the others, is hydrogen, methyl, ethyl, methoxy or chlorine, $R^5$ is $C_2$–$C_4$-alkyl, X is $C_1$–$C_{24}$-mono- or dialkylamino, monobenzylamino, mono-(phenyl-ethyl)-amino, monophenylamino, N-($C_1$–$C_{12}$-alkyl)-N-benzylamino, N-($C_1$–$C_{12}$-alkyl)-N-(phenylethyl)amino or N-($C_1$–$C_{12}$-alkyl)-N-phenylamino or each of the phenyls substituted by $C_1$–$C_{12}$-alkyl, cyclo-hexyl, 4-($C_1$–$C_{12}$-alkyl)cyclohexyl, (Abstract continued on next page.)

$C_1$–$C_{24}$-alkyloxy, phenoxy or $C_1$–$C_{24}$-alkanoyloxyl, or is OR, where R is $C_1$–$C_{24}$-alkyl, unsubstituted or $C_1$–$C_{12}$-alkyl-, cyclohexyl-, 4-($C_1$–$C_{12}$-alkyl)cyclohexyl-, $C_1$–$C_{24}$-alkoxy-, phenoxy- or $C_1$–$C_{24}$-alkanoyl-oxy-substituted benzyl or phenylethyl, and A is a radical of the formula

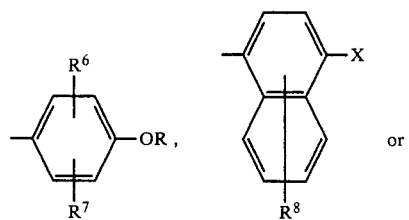

-continued

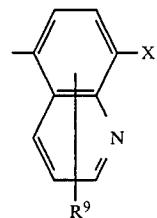

where R and X each have the above-mentioned meanings, and $R^6$ is hydrogen or $C_1$–$C_{14}$-alkyl, $R^7$ is hydrogen, methyl, ethyl, methoxy or chlorine, $R^8$ is hydrogen, methyl, hydroxy or $C_1$–$C_8$-alkoxy and $R^9$ is hydrogen or methyl, or the rings B, or B and C being benzofused, are used in liquid crystalline media and for dyeing synthetic polymers.

2 Claims, 1 Drawing Sheet

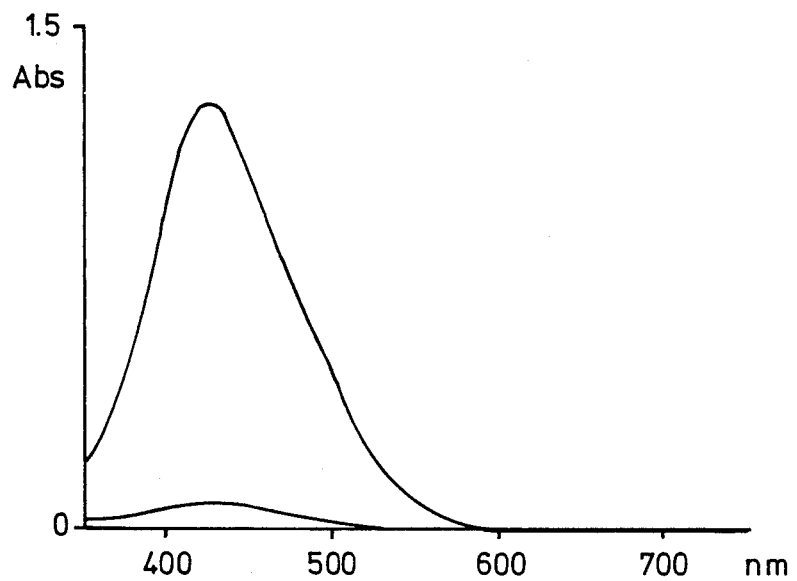

TRISAZO DYES

The present invention relates to a novel trisazo dye and to the use thereof in liquid-crystalline media and for dyeing synthetic polymers or fibers.

Liquid-crystalline materials which contain pleochroic dyes are used in displays. The fundamentals of the use according to the invention are known and described for example in H. Kelker and R. Hatz, Handbook of Liquid Crystals, p. 611 (1980), R. J. Cox, Mol. Cryst. Liq. Cryst. Vol. 55 (1979), 51, L. Pauls and G. Schwarz, Elektronik 14 (1982), 66. These publications contain further references where the use according to the invention is described in detail.

Dyes for liquid crystal mixtures must meet several requirements (see for example B. J. Constant et al., J. Phys. D: Appl. Phys. 11 (1978), 479, F. Jones and T. J. Reeve, Mol. Cryst. Liq. Cryst. 60 (1980), 99, EP-A-43,904, EP-A-55,838, EP-A-65,869). They must not ionize in the electric field and must have a very high molar extinction coefficient s and a high solubility in the liquid crystal matrix used. Furthermore, they should be chemically and in particular photochemically stable and, in order to produce a high contrast in the guest-host display, should have in the particular nematic phase an order parameter S which ideally is not less than 0.75.

Dyes which meet all these requirements are predominantly found in the class of the anthraquinones (see for example EP-A-56,492, EP-A-91,225, DE-A-3,028,593, EP- A-54,217 or DE-A-2,902,177).

Existing azo dyes generally have the disadvantage that the light stability and/or the solubility do not meet the high requirements (see for example G. W. Gray, Chimia 34 (1980), 47)

Symmetrically constructed dichroic trisazo dyes having a higher order parameter are known and are described for example in DE-A-3,342,040.

Even so, there is still a need to improve the light fastness and in particular the solubility in the low-viscosity and increasingly apolar liquid crystal mixtures used today, such as ZLI 2452, ZLI 2585, ZLI 2806 or ZLI 2903 from Merck.

It is an object of the present invention to provide a yellow, orange or red trisazo dye which, in commercial liquid crystal mixtures, has a high order parameter coupled with a very high solubility and light stability.

We have found that this object is achieved with a trisazo dye of the formula I

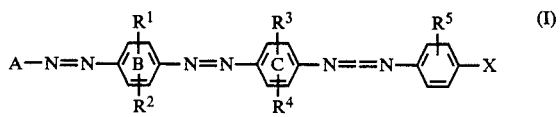

where $R^1$, $R^2$, $R^3$ and $R^4$ are identical or different and each, independently of the others, is hydrogen, methyl, ethyl, methoxy or chlorine, $R^5$ is $C_2$–$C_4$-alkyl, X is $C_1$–$C_{24}$ -mono- or dialkylamino, monobenzylamino, mono-(phenyl-ethyl)-amino, monophenylamino, N-($C_1$–$C_{12}$-alkyl)-N-benzylamino, N-($C_1$–$C_{12}$-alkyl)-N-(phenylethyl)amino or N-($C_1$–$C_{12}$-alkyl)-N-phenylamino where each of the phenyls may be substituted by $C_1$–$C_{12}$-alkyl, cyclohexyl, 4-($C_1$–$C_{12}$-alkyl)-cyclohexyl, $C_1$–$C_{24}$-alkyloxy, phenoxy or $C_1$–$C_{24}$ -alkanoyloxy, or is OR, where R is $C_1$–$C_{24}$-alkyl, unsubstituted or $C_1$–$C_{12}$-alkyl-, cyclohexyl-, 4-($C_1$–$C_{12}$-alkyl)- cyclohexyl-, $C_1$–$C_{24}$-alkoxy-, phenoxy- or $C_1$–$C_{24}$-alkanoyloxy-substituted benzyl or phenylethyl, and A is a radical of the formula

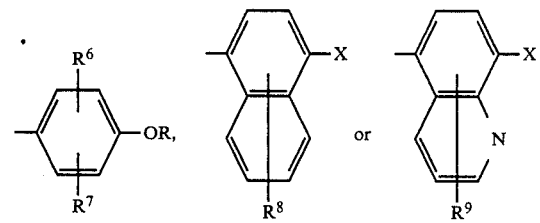

where R and X each have the abovementioned meanings, and $R^6$ is hydrogen or $C_1$–$C_{14}$-alkyl, $R^7$ is hydrogen, methyl, ethyl, methoxy or chlorine, $R^8$ is hydrogen, methyl, hydroxyl or $C_1$–$C_8$-alkoxy and $R^9$ is hydrogen or methyl and the rings B and/or C may also be benzofused.

The trisazo compounds according to the invention thus have one or more lateral ethyl, propyl or butyl groups. We have found, surprisingly, that introducing these lateral groups substantially increases solubility of the trisazo dyes in commercial liquid crystal mixtures compared with lateral methyl, methoxy or chlorine while leaving the order parameter substantially unchanged (see also G. W. Gray in Chimia 34 (1980), 53 or F. Jones and T. J. Reeve in JSDC 95 (1979), 356).

In addition, the trisazo dyes according to the invention have excellent light stability in commercial liquid crystal mixtures.

Preference is given to trisazo dyes of the formula I where A is a radical of the formula

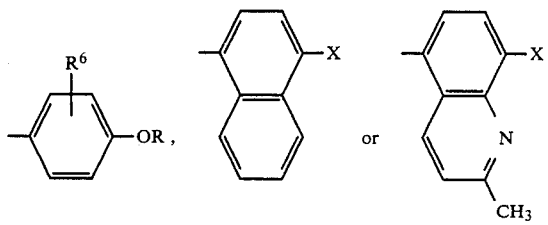

where R, $R^6$ and X each have the abovementioned meanings.

Preference is further given to trisazo dyes of the formula I where R is $C_4$–$C_{12}$-alkyl, benzyl or $C_4$–$C_{12}$-alkyl-, cyclohexyl-, 4-($C_1$–$C_{12}$-alkyl, cyclohexyl- or $C_4$–$C_{12}$-alkoxy-substituted benzyl.

Preference is further given to trisazo dyes of the formula I where $R^1$, $R^2$, $R^3$, $R^4$ and $R^7$ are each hydrogen.

Preference is further given to trisazo dyes of the formula I where ring B or C is benzofused.

Preference is further given to trisazo dyes of the formula I where $R^5$ is ethyl.

Preference is further given to trisazo dyes of the formula I where $R^6$ is methyl or ethyl.

Preference is further given to trisazo dyes of the formula I where X is $C_4$–$C_{12}$-alkoxy, benzyloxy, $C_4$–$C_{12}$-alkyl-, cyclohexyl-, 4-($C_1$ -$C_{12}$-alkyl)cyclohexyl-or $C_4$–$C_{12}$-alkoxy-substituted benzyloxy, $C_4$–$C_{12}$-alkylamino or unsubstituted or $C_4$–$C_{12}$-alkyl-, cyclohexyl, 4- $C_1$–$C_{12}$-alkyl)-C12alkyl)<cyclohexyl- or $C_4$–$C_{12}$-alkoxy-substituted benzylamino.

Particular preference is given to trisazo dyes of the formulae Ia, Ib, Id, Ie and If

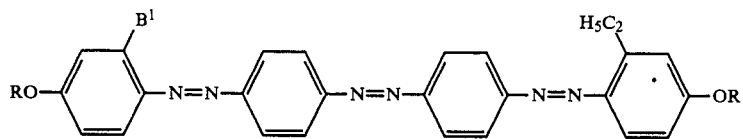
(Ia)

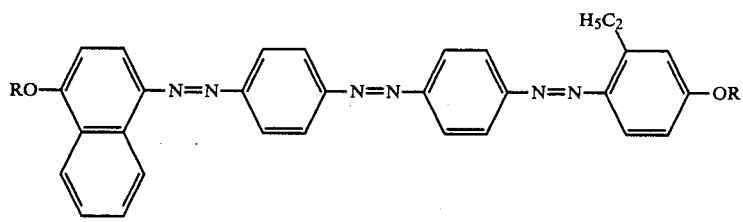
(Ib)

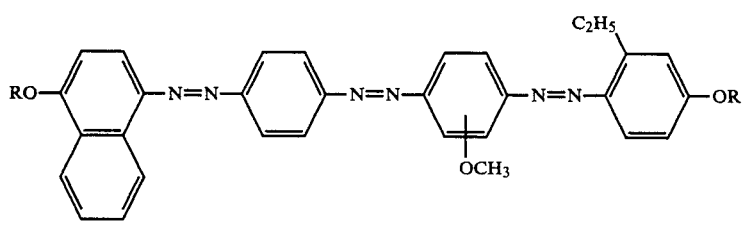
(Ic)

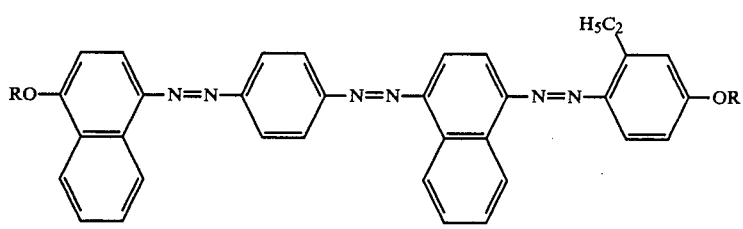
(Id)

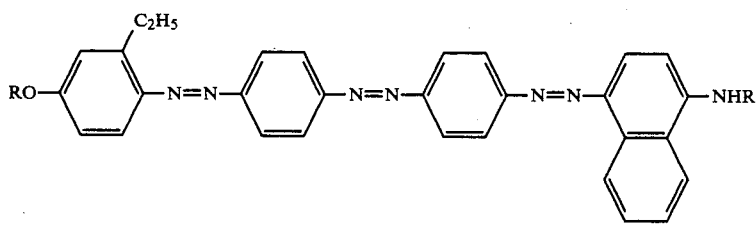
(Ie)

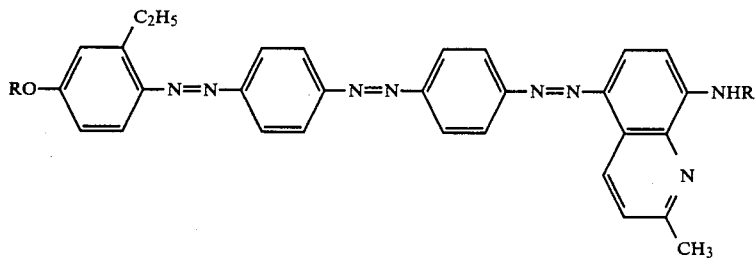
(If)

Where the Rs in the individual formulae are identical or preferably different and each is, independently of the others, $C_4$–$C_{12}$-alkyl, benzyl or $C_4$–$C_{12}$-alkyl-, cyclohexyl-, 4-($C_4$–$C_{12}$)-cyclohexyl- or $C_4$–$C_{12}$-alkoxy-substituted benzyl, and $B^1$ is methyl or ethyl.

Specific examples of R are:
n—$C_4H_9$, —$CH_2$—$CH(CH_3)_2$, -$C(CH_3)_3$, n—$C_5H_{11}$, —CHhd 2-$CH(CH_3)C_2H_5$, n—$C_6H_{13}$, $CH(CH_3)C_4H_9$n—$C_7H_{15}$, —$CH(CH_3)C_5H_{11}$, n—$C_8H_{17}$, —$CH_2$-$CH(C_2H_5)C_4H_9$, —$CH_2$—$C(CH_3)_2$—$CH_2C(CH_3)_2$, -$CH(CH_3)C_6H_{13}$, —$CH(C_2H_5)C_5H_{11}$, n—$C_9H_{19}$, —$CH(CH_3)C_7H_{15}$, —$CH(C_2H_5)C_6H_{13}$, —$CH(C_3H_7)C_5H_{11}$, —$CH(C_5H_{11}$, —$CH(C_4H_9)_2$, n—$C_{10}H_{21}$, —$CH(CH_3)C_8H_{17}$, —$CH(C_2H_5)C_7H_{15}$, —$CH(C_3H_7)C_6H_{13}$, n—$C_{1123}$, —$CH(CH_3)C_9H_{19}$, —n—$C_{12}H_{25}$, —$CH(CH_3)C_{10}H_{21}$, benzyl, 4-n-butylbenzyl, 4-n-pentylbenzyl, 4-n-hexylbenzyl, 4-n-heptylbenzyl, 4-n-octylbenzyl, 4-n-nonylbenzyl, 4-n-decylbenzyl, 4-n-undecylbenzyl, 4-n-dodecylbenzyl, 4-cyclohexylbenzyl, 4-(4'-n-propylcyclohexyl)-benzyl, 4-(4'-n-butylcyclohexyl)-benzyl, 4-(4'-n-pentylcyclohexyl)-benzyl, 4-(4'-n-hexyl-cyclohexyl)-benzyl, 4-(4'-n-heptylcyclohexyl)-benzyl, 4-n-butyloxybenzyl, 4-n-pentyloxybenzyl, 4-n-hexyloxy-benzyl, 4-(hexyl-2-oxy)-benzyl, 4-n-octylbenzyl, 4-(octyl-2-oxy)benzyl and 4-(2-ethylhexyl-1-oxy)-benzyl.

Particular preference is also given to trisazo dyes of the formulae Ia, Ib, Ic and Id where the Rs in the individual formulae are different, one being benzyl and the other $C_4$–$C_{12}$-alkyl.

To prepare a trisazo dye of the formula I, an azo dye of the formula II

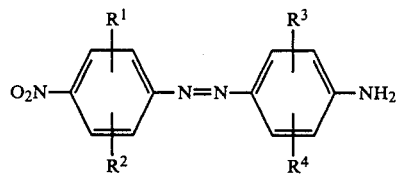

(II)

where $R^1$, $R^2$, $R^3$ and $R^4$ each have the abovementioned meanings, can be diazotized and reacted with a coupling component of the formula III

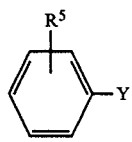

(III)

where $R^5$ has the abovementioned meaning and Y is hydroxyl, $C_1$–$C_{24}$-mono- or dialkylamino, monobenzylamino, mono-(phenylethyl)amino, monophenylamino, N-($C_1$–$C_{12}$-alkyl)-N-benzylamino, N-($C_1$,–$C_{12}$-alkyl)-N-(phenylethyl)amino or N-($C_1$–$C_{12}$-alkyl)-N-phenylamino, where the phenyls may each be substituted by $C_1$–$C_{12}$-alkyl, cyclohexyl, 4-($C_1$–$C_{12}$-alkyl)cyclohexyl, $C_1$–$C_{24}$-alkoxy, phenoxy or $C_1$–$C_{24}$-alkanoyloxy, to give a compound of the formula IV (IV)

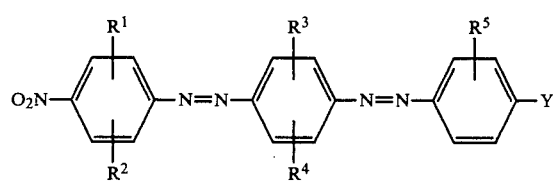

where $R^1$, $R^2$, $R^3$, $R^5$ and Y each have the abovementioned meanings.

If Y is hydroxyl, a compound of the formula IV can be converted into the substituted hydroxy compound in a conventional manner.

The nitro compound of the formula IV can be reduced for example with sodium sulfide to the corresponding amino compound, which is then diazotized again and reacted with a coupling component of the formula

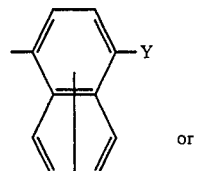

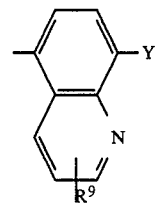

where $R^6$, $R^7$, $R^8$ and Y each have the abovementioned meanings, to give a trisazo dye of the formula I. The conversion of the dye where Y is hydroxyl into a trisazo dye according to the invention and of the formula I where Y is OR is again effected in a conventional manner.

The novel trisazo dye can be purified by chromatography over silica gel, for example using a toluene/ethyl acetate mixture or methylene chloride as eluent. The dye is then recrystallized, for example from toluene. The purity is preferably checked by thin layer chromatography HPLC and elemental analysis.

The Examples which follow illustrate the invention in more detail. (A representative method of preparation for the dyes of the formula I is described therein in Example 1 below.) Percentages are by weight, unless otherwise stated.

EXAMPLE 1

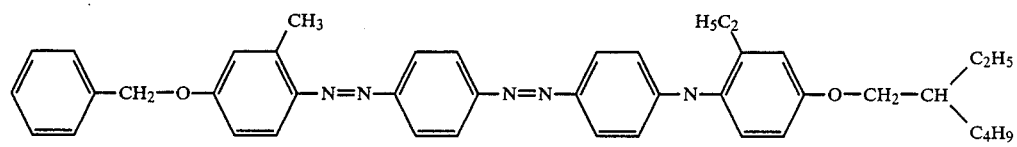

To a mixture of 124 g of 4-amino-4'-nitroazobenzene and 1000 ml of water at 5° C. were added 150 g of 23% strength sodium nitrite solution, followed by 50 g of concentrated hydrochloric acid. The mixture was subsequently stirred at 5° C. for 5 hours and then treated with 5 g of active carbon and filtered. The filtrate was added with ice-cooling to a solution of 54 g of m-cresol, 20 g of sodium hydroxide and 500 ml of water while the solution was maintained at pH 7 by adding dilute sodium hydroxide solution. The mixture was subsequently stirred at room temperature for 1 hour and the resulting dye was then filtered off with suction, washed with water and dried to give 170 g (94% of theory) of a disazo dye of the formula

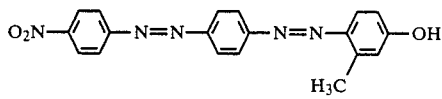

melting point 272° C.

A mixture of 72.2 g of this disazo dye, 4.2 g of benzyl bromide, 27.6 g of potassium carbonate and 400 ml of N,N-dimethylformamide were stirred at 100° C. for 3 hours, the resulting precipitate was filtered off cold with suction, washed with a little N,N-dimethylformamide and then with water, and dried to give 56 g (62% of theory) of the alkylated dye of the formula

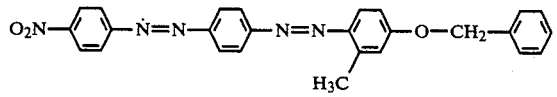

melting point: 200° C.

78.4 g of the alkylated disazo dye were heated for 5 hours at the boil in a mixture of 700 ml of water, 500 ml of toluene, 76.1 g of sodium sulfide and 24.7 g of ammonium chloride. The toluene was then distilled out of the mixture, 200 ml of methanol were added, and the precipitate was filtered off with suction, washed with methanol and then with water and dried to give 68.5 g (96% of theory) of an amino compound of the formula

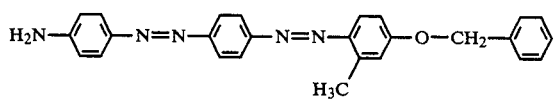

melting point: 205° C.

42.1 g of the amino compound were suspended in 500 ml of a glacial acetic acid/propionic acid mixture (7/2). While cooling with ice, 30 ml of 23% strength sodium nitrite solution were added followed by 25 ml of concentrated hydrochloric acid. After stirring at 5° C. for 5 hours the diazonium salt solution was added with stirring to a solution of 12.2 g of 3-ethylphenol, 8 g of 50% strength sodium hydroxide solution, 100 ml of water and 200 g of ice while the solution was maintained at pH 7 by adding dilute sodium hydroxide solution. The mixture was stirred at room temperature for a further hour, and the resulting precipitate was filtered off with suction and washed with water to give 52.6 g (95% of theory) of a trisazo dye of the formula

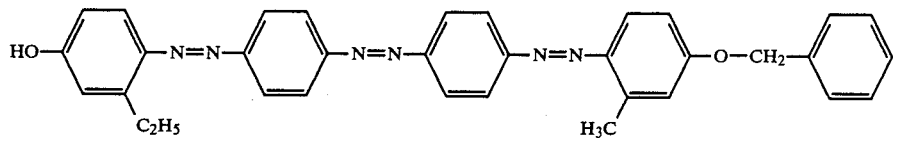

melting point: 180° C.

A mixture of 8.3 g of this trisazo dye, 2.9 g of 3-(bromomethyl)heptane, 2.1 g of potassium carbonate, 0.2 g of potassium iodide and 100 ml of N,N-dimethylformamide was stirred at 120 ° C. for 6 hours and then filtered cold with suction, and the residue was washed with a little N,N-dimethylformamide, then with methanol and finally with water to give 5.9 g (59% of theory) of a crude dye of the formula

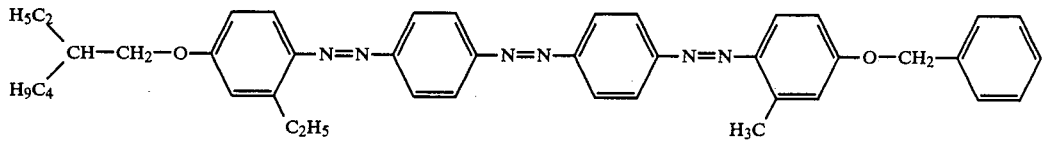

The dye was purified by chromatography over silica gel (from limerick, silica gel 60, 0.063–0.0200 mm) with 40/1 toluene/ethyl acetate as eluent and subsequent recrystallization from toluene/petroleum ether. Melting point: 122° C.

The same method was also used to obtain the dyes listed in Tables 1 to 4 below.

TABLE 1

| Ex. No. | $R^1$ | $R^2$ | $R^3$ | $R^4$ |
|---|---|---|---|---|
| 2 | $C_5H_{11}$ | $C_8H_{17}$ | $CH_3$ | $C_2H_5$ |
| 3 | $C_5H_{11}$ | $C_8H_{17}$ | $C_2H_5$ | $CH_3$ |
| 4 | H | $C_8H_{17}$ | $C_2H_5$ | $C_2H_5$ |
| 5 | $C_5H_{11}O$ | $C_8H_{17}$ | $C_2H_5$ | $C_2H_5$ |
| 6 | $C_4H_9$—⟨H⟩— | $C_8H_{17}$ | $C_2H_5$ | $C_2H_5$ |
| 7 | H | $CH_2$—$CH_2(C_2H_5)C_4H_9$ | $CH_3$ | $C_3H_7$ |
| 8 | H | $CH_2$—$CH_2(C_2H_5)C_4H_9$ | $CH_3$ | $C_4H_9$ |

TABLE 2
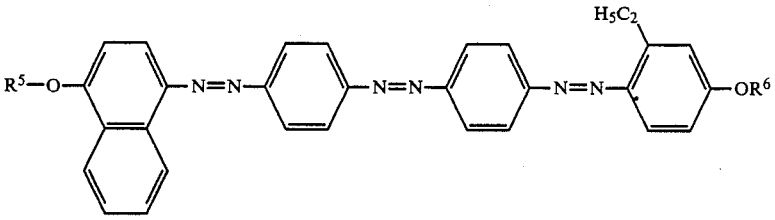
| Ex. No. | R⁵ | R⁶ |
|---|---|---|
| 9 | | CH₂—CH(C₂H₅)C₄H₉ |
| 10 | C₄H₉(C₂H₅)CH—CH₂ | |
| 11 | C₅H₁₁—O—C₆H₄—CH₂ | C₈H₁₇ |
| 12 | C₅H₁₁—C₆H₄—CH₂ | C₈H₁₇ |
| 13 | C₅H₁₁—O—C₆H₄—CH₂ | CH₂—CH(C₂H₅)C₄H₉ |
| 14 | C₅H₁₁—C₆H₄—CH₂ | CH₂—CH(C₂H₅)C₄H₉ |
TABLE 3
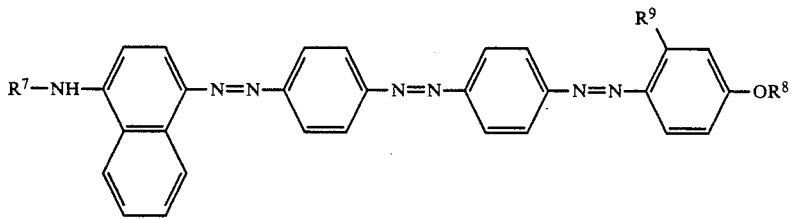
| Ex. No. | R⁷ | R⁸ | R⁹ |
|---|---|---|---|
| 15 | C₁₂H₂₅ | C₈H₁₇ | C₂H₅ |
| 16 | C₁₂H₂₅ | CH₂—CH(C₂H₅)C₄H₉ | C₂H₅ |
| 17 | C₈H₁₇ | CH₂—CH(C₂H₅)C₄H₉ | C₃H₇ |
| 18 | C₇H₁₅ | CH₂—CH(C₂H₅)C₄H₉ | C₄H₉ |

TABLE 4

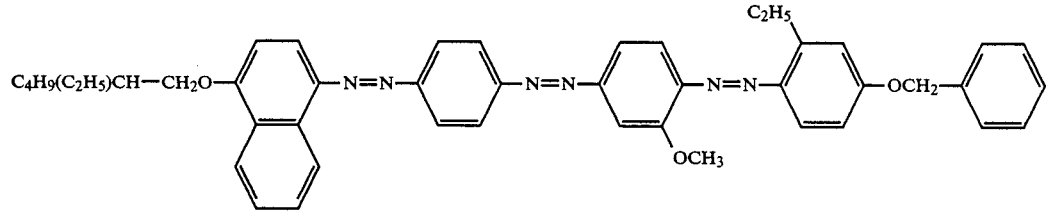

| Ex. No. | R^10 | R^11 |
|---|---|---|
| 19 | benzyl (C6H5-CH2-) | $CH_2-CH(C_2H_5)C_4H_9$ |
| 20 | $C_4H_9(C_2H_5)CH-CH_2$ | $CH_2$-phenyl |

EXAMPLE 21

[Structure: $C_4H_9(C_2H_5)CH-CH_2O$—naphthyl—N=N—phenyl—N=N—phenyl(OCH3)—N=N—phenyl(C2H5)—OCH2—phenyl]

Table 5 summarizes the results obtained on measuring each of Examples 1 to 5, 9 to 16 and 19 to 21 in respect of the order parameter S at room temperature in ZLI 2452 from Merck, the solubility L, likewise determined at room temperature and in ZLI 2452, the melting point and the absorption maximum determined in methylene chloride.

The order parameter S was determined in accordance with the known equation $$S = \frac{CR - 1}{CR + 2}$$

in a commercial measurement cell of homogeneous edge orientation (polyimide). The dichroic ratio CR was determined by measuring the absorbences E∥ (measurement with light polarized parallel to the preferential direction of the nematic phase) and E⊥ (measurement with light polarized perpendicular to the preferential direction of the nematic phase) and applying the relationship $$CR = \frac{E^{\parallel}}{E^{\perp}},$$

the dye concentration being so chosen as to give an E∥ within the range from 1 to 2. The measurements were carried out on an Hitachi U 3200 spectrophotometer.

FIG. 1 depicts the absorbences Ehu ∥ and E⊥ for the compound of Example I in ZLI 2452.

The solubility was determined as follows:

50 mg of the dye was stirred at room temperature into 1 ml of liquid crystal for 1 week, the saturated solution was centrifuged off the residue, and the solubility was determined by comparing the absorbences.

The light stability of the dyes in the liquid crystal was determined by high-speed exposure of the solution in the measurement cell in a Suntest (from Hanau) at 25° C. The dyes exhibited excellent photostability, in particular if a Uv-blocking coating was used.

TABLE 5

| Ex. No. | Order parameter S (at RT) | Solubility L [%] (at RT) | Melting point [°C.] | λmax [nm] (CH2Cl2) |
|---|---|---|---|---|
| 1 | 0.815 | 18.7 | 122 | 417 |
| 2 | 0.83 | 5.1 | 139 | 418 |
| 3 | 0.82 | 5.3 | 131 | 418 |
| 4 | 0.79 | 6.4 | 126 | 419 |
| 5 | 0.79 | 3.5 | 110 | 418 |
| 9 | 0.81 | 2.0 | 188 | 443 |
| 10 | 0.81 | 7.1 | 120 | 445 |
| 11 | 0.79 | 3.4 | 153 | 437 |
| 12 | 0.79 | 2.4 | 148 | 441 |
| 13 | 0.79 | 2.9 | 148 | 435 |
| 14 | 0.81 | 5.0 | 136 | 443 |
| 15 | 0.81 | 2.0 | 130 | 535 |
| 16 | 0.80 | 8.0 | 112 | 533 |
| 19 | 0.79 | 1.6 | 196 | 486 |
| 20 | 0.80 | 1.3 | 158 | 489 |
| 21 | 0.79 | 5.5 | 137 | 459 |

I claim:

1. A trisazo dye of the formula I

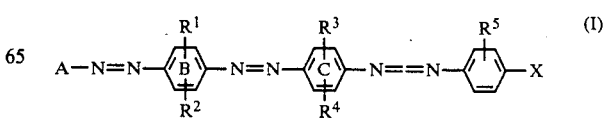

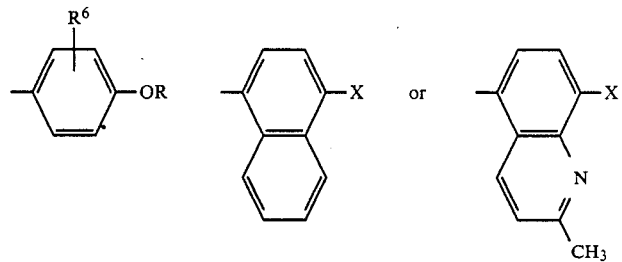

where $R^1$, $R^2$, $R^3$ and $R^4$ are hydrogen, $R^5$ is ethyl, X is $C_4$–$C_{12}$-alkoxy, benzyloxy, $C_4$–$C_{12}$-alkyl-, cyclohexyl-, 4-($C_1$–$C_{12}$-alkyl)cyclohexyl- or $C_4$–$C_{12}$-alkoxy-substituted benzyloxy, $C_4$–$C_{12}$-alkylamino or unsubstituted or $C_4$–$C_{12}$-alkyl-, cyclohexyl-, 4-(Chd 1 –$C_{12}$ -alkyl) cyclohexyl- or $C_4$–$C_{12}$-alkoxy-substituted benzylamino, and A is a radical of the formula where R is $C_4$–$C_{12}$-alkyl, benzyl or $C_4$–$C_{12}$ -alkyl-, cyclohexyl-, 4-($C_1$–$C_{12}$-alkyl)cyclohexyl- or $C_4$–$C_{12}$-alkoxy-substituted benzyl, $R^6$ is methyl, X has the abovementioned meaning, or the rings B, C or B and C being benzofused.

2. A trisazo dye as claimed in claim 1 of the formula:

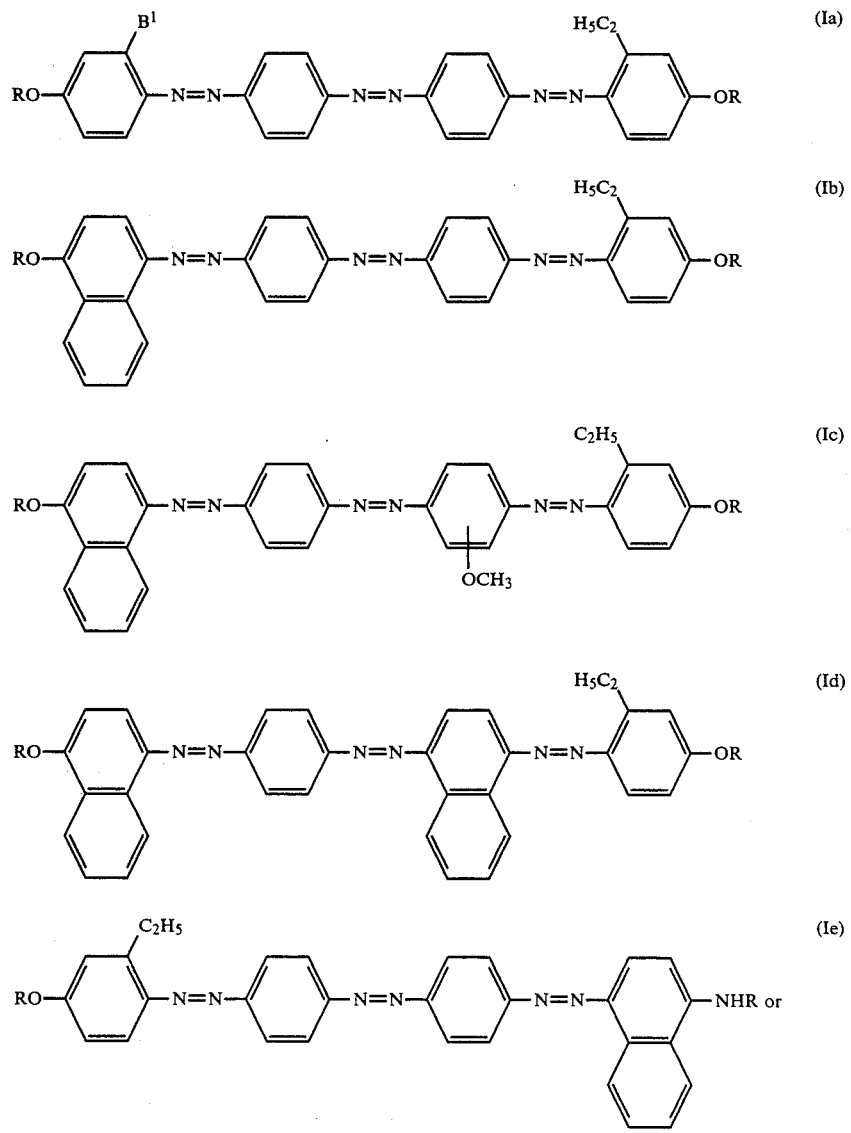

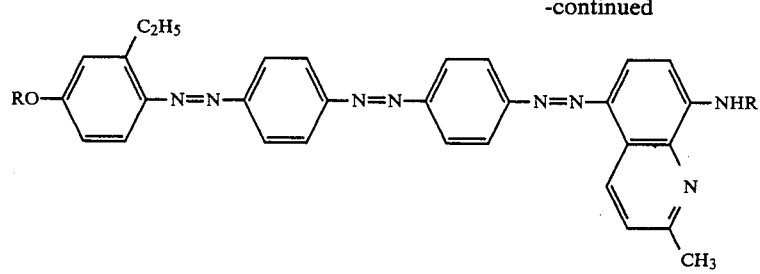
(If)
where the Rs in the individual formulae are identical or different and each is, independently of the others, $C_4$–$C_{12}$-alkyl, benzyl or $C_4$–$C_{12}$-alkyl-, cyclohexyl-, -($C_4$–$C_{12}$)-cyclohexyl- or $C_4$–$C_{12}$-alkoxy-substituted benzyl, and $B^1$ is methyl.
* * * * *